United States Patent [19]

Cuming

[11] Patent Number: 4,934,400
[45] Date of Patent: Jun. 19, 1990

[54] IRRIGATION CONTROL SYSTEM

[76] Inventor: Kenneth J. Cuming, 68 Robinson Rd., Hawthorn, Victoria, Australia

[21] Appl. No.: 298,373

[22] Filed: Jan. 18, 1989

[30] Foreign Application Priority Data

Jan. 18, 1988 [AU] Australia .................. PI6338

[51] Int. Cl.$^5$ ............................................. F16K 17/36
[52] U.S. Cl. .............................. 137/78.3; 137/624.12; 239/64; 239/70
[58] Field of Search ............. 137/78.3, 624.11, 624.12; 239/64, 69, 70

[56] References Cited

U.S. PATENT DOCUMENTS 4,545,396  10/1985  Miller et al. ............ 137/78.3
4,683,904   8/1987  Itis ......................... 137/78.3
4,695,419   9/1987  Weintraub et al. ...... 137/78.3

Primary Examiner—A. Michael Chambers
Attorney, Agent, or Firm—Albert L. Jeffers

[57] ABSTRACT

An irrigation control system includes a soil moisture sensor (S) that controls the common lines of various irrigation valves (VA) being controlled by a conventional irrigation time based controller (TC). The sensor is in a first zone of primarily shallow rooted plants. A timer (TR) is activated whenever the soil moisture sensor allows the first zone to be watered. The timer (TR) increments a counter (CR) which closes after a pre-set number of irrigation cycles of the first zone having been completed. When the counter (CR) close contacts (C), then the irrigation valves feeding a second zone of primarily deep rooted plants are activated.

5 Claims, 1 Drawing Sheet

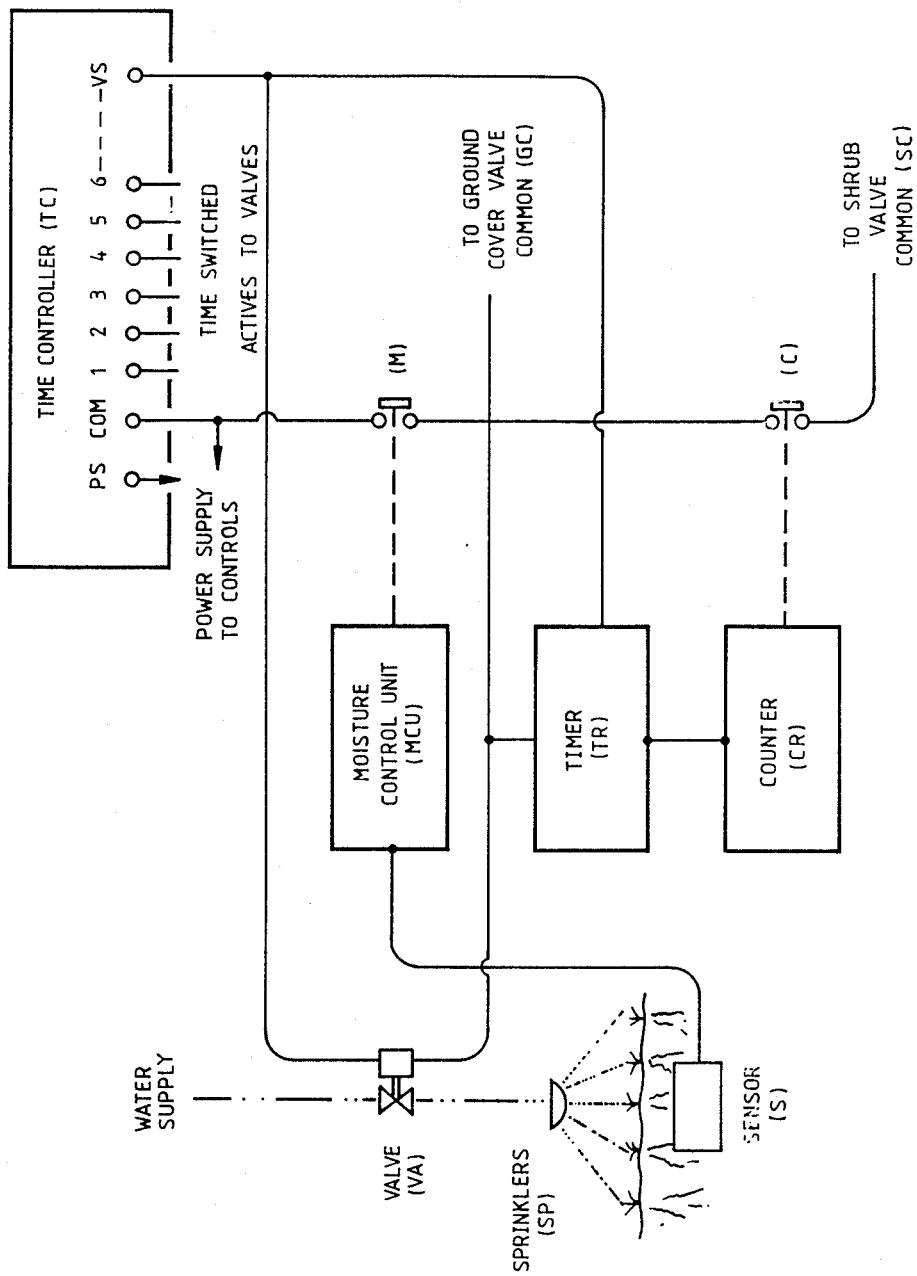

IRRIGATION CONTROL SYSTEM

TECHNICAL FIELD

The present invention relates to apparatus for controlling the application of water to an area of soil. The invention preferably is aimed at providing:
1. Extended interval irrigation cycles with fully automatic control relative to plant water usage.
2. Minimizing water usage.
3. Providing an optimum root environment.
4. Minimizing leaching of solubles.

BACKGROUND OF THE INVENTION

Many shrubs and trees have extensive root systems which reach deep into the soil profile, typically one to two meters.

Most turf and ground cover have relatively shallow roots and require more frequent application of water to replace evapotranspiration because the soil reservoir available to their root system is relatively small.

Existing practice with typical timer control systems is to provide a dual program control which enables two separate groups of valves to be timed independently for a number of days between irrigations and to water for durations independent of each other.

The problem with that type of control is that it is quite arbitrary and independent of a situation which varies from day to day as the weather changes and it has no tangible relationship with plant water use.

Experience with irrigation in practical situations using an accurate soil moisture control (such as that shown in U.S. Pat. No. 4,513,608) has demonstrated that a close relationship can be maintained automatically between the actual plant water use and the controlled irrigation water supplied.

Because of its minimum interval and for physical reasons, the most practical location for a sensor is within the root zone of most shallow rooted plants being watered by that particular control system. While this sensor location optimizes water replacement for the shallow rooted plants, those deep rooted systems requiring a deep watering less frequently suffer and excess water use can occur.

SUMMARY OF THE INVENTION

One aspect of the present invention is to provide a simplified irrigation controller for controlling water supply to areas containing plants with differing root systems which avoids or minimizes the difficulties associated with known arrangements of this kind as discussed above.

Accordingly, the present invention provides an irrigation controller for controlling water supply via a water distribution system including separate valve means for directing or preventing water flow to different zones, wherein each of said zones contain either primarily shallow rooted or deep rooted plants, said controller arrangement comprising a moisture sensing device adapted for location in a first said zone containing shallow rooted plants for sensing soil moisture content of said first zone, first circuit means for energizing and de-energizing the said valve means controlling water flow to the or each of said zones primarily containing shallow rooted plants, second circuit means for energizing and de-energizing the valve means controlling water flow to the or each of said zones primarily containing deep rooted plants, first energizing means for energizing said first circuit means when said moisture sensing device determines that the soil moisture content of said first zone is below a predetermined level, counter means for counting a predetermined number of cycles that said first circuit means is energized, and second energizing means for energizing said second circuit means each time after said predetermined number of cycles that said first circuit means is energized.

Preferably, said first and second circuit means are interconnected whereby said valve means for controlling water flow to the or each said zone containing deep rooted plants are energized only when both said first and second circuit means are energized. Conveniently, a time controller can be associated with the valve means of both the shallow and deep root zones so that the valve means can be activated in sequence for adjustable periods of time and also reactivated to obtain the optimum water replacement to suit each zone when the first and/or second circuit means are energized.

BRIEF DESCRIPTION OF THE DRAWING

The present invention will be described hereafter in the following Detailed Description, when taken in conjunction with the following drawing, in which like reference characters refer to like elements throughout.

The drawing is a schematic view of an improved irrigation control system according to the present invention.

DETAILED DESCRIPTION

In the preferred arrangement, illustrated in the accompanying drawing, a soil sensor (S) is located in a root zone in an area of ground cover, i.e. in a first zone comprising the roots of primarily shallow rooted plants. The sensor (S) may have any suitable structure for measuring the moisture content of the soil in the first zone. For example, sensor (S) can be of the type shown in my prior U.S. Pat. No. 4,513,608, which is hereby incorporated by reference.

One or more sprinklers (SP) overlie the area to be irrigated. At least one of these sprinklers (SP) is positioned to spread water on the first zone containing the sensor (S). One or more valves (VA) are connected to the sprinklers in a known manner to turn the water flow to the sprinklers on and off. For example, if the area being irrigated is large, then the sprinklers will typically be grouped together in spaced groups with each group being controlled by its own valve. If the area being irrigated is small, then perhaps only one group of sprinklers will be used with only one control valve for all the sprinklers. The control system shown in the drawing assumes that multiple groups of sprinklers will be used, thus requiring multiple valves for controlling these groups.

Regardless of the size of the area being irrigated, the area to be irrigated often contains plants having roots in two zones defined by root depth. As previously indicated, there is a first zone of primarily shallow rooted plants (ground cover type plants) which is where sensor (S) is located. In addition, there will often be other plants in the area, such as shrubs, that are primarily deep rooted plants. Additional sprinkler and valve groupings (not shown) will be used for sprinkling these deep rooted plants.

Thus, the irrigation system will have some sprinklers and valves for watering shallow rooted plants, termed herein the ground cover sprinklers and valves, and other sprinklers and valves for watering deep rooted plants, termed herein the shrub sprinklers and valves. While only one set of sprinklers (SP) and one valve (VA) is illustrated in the drawings, i.e. a ground cover sprinkler and valve, it should be understood that at least one shrub sprinkler and valve grouping is also present. Possibly, the irrigation system could have multiple groupings of both ground cover and shrub sprinklers and valves. In any event, the present invention provides an irrigation control operation that waters shallow rooted plants according to their actual needs and ratios less frequent watering for deeper rooted plants based on multiples of the intervals resulting from the actual water use of the shallow rooted plants.

As shown in the drawing, a typical interval based irrigation controller of the type commonly used in the irrigation industry, identified herein as the time controller (TC), is provided for sequencing and timing the irrigation valves. The controller (TC) has any desired number of control outputs (1-6 etc.), each of which is connected by a control line to one of the valves (VA), either a ground cover valve or a shrub valve. The output on the controller which is connected to the ground cover valve used for controlling the sprinklers watering the area containing the sensor (S) is identified herein as (VS).

Basically, the controller (TC) is a timing device, either an electro-mechanical or electronic type, which can be programmed by the user to define when the valves (VA) will be turn on and off and how long each valve will run. Once programmed, these intervals (i.e. the intervals between valve actuation and the interval of valve operation) generally remain constant and independent of the weather conditions until they are changed by the user. The controller can be programmed so that different timed intervals are provided for the ground cover valves as opposed to the shrub valves. For example, it might be desired to turn on the ground cover valves more often than the shrub valves, but to let the shrub valves run a longer time when they do turn on as opposed to a typical run time for ground cover valves. As noted, such a controller (TC) is well known in the irrigation industry and there are numerous types of this controller that could be used.

One difficulty with using just a time based controller, such as the controller (TC), is that water is applied to the plants whether or not it is needed, e.g. even when it is raining or the soil otherwise has adequate moisture. To avoid this obvious overuse of water, and the possibility of plant damage from too much water, the sensor (S) is connected into the irrigation control system to stop the irrigation process when the shallow rooted plants have already had enough water.

In this regard, the sensor (S) is connected to a moisture control unit (MCU). The unit is used to control some electrical contacts (M) which are arranged in the common lines of all the irrigation valves (VA), both the ground cover as well as the shrub valves. The moisture control unit (MCU) can have many forms, but basically it monitors the soil moisture level as read by the sensor (S) and then controls the contacts (M) accordingly. For example, when the sensor (S) is wet relative to its set point, the moisture control unit (MCU) causes the contacts (M) to open. Thus, even though the controller (TC) might then be calling for one or more of the valves (VA) to be open, either the ground cover or shrub valves, the valves cannot open because their common lines (GC) and (SC) are broken by the contacts (M).

When the sensor (S) is dry relative to its set point, the moisture control unit (MCU) causes the contacts (M) to close so the valves (VA) can then be energized by the controller (TC). While this will allow the ground cover valves to operate if called for by the controller (TC), the control system of this invention recognizes that the shrub valves, i.e. the valves feeding water to the deep rooted plants, should not operate as often to prevent overwatering the deep rooted plants. Thus, a counter (CR) is used to control another set of contacts (C) positioned in the common lines of just the shrub valves. For the shrub valves to operate when called for by the controller (TC), both sets of contacts (M) and (C) have to be closed.

The counter (CR) is connected into the control system in the following way. If contacts (M) are closed, then each time the controller (TC) sends an output signal along the output (VS), i.e. to activate the valve (VA) causing the sprinkler(s) (SP) to apply water to the location of the sensor (S), then a timer (TR) is reset. The timer (TR) starts to time out when the output (VS) is activated. After a time period which exceeds the desired interval in which the ground cover would ordinarily be properly watered with a predetermined amount of water, including the occurrence of any repeat cycles used by the controller (TC) to achieve this watering, the timer (TR) times out and a count is registered by the counter (CR) which also advances a series of indicator lights. The counter (CR) is set to close contacts (C) after the number of counts from Timer (TR) equals the ratio of the intervals required between the shallow and the deep rooted plants. This ratio can have any desired value depending on the particular types of shallow and deep rooted plants involved.

Once contacts (C) are closed by counter (CR), they remain closed and await the next occasion when contacts (M) are closed by the operation of sensor (S). Now, since both contacts (M) and (C) are now closed, then all the valves, both the ground cover valves and the shrub valves, will be activated by the controller (TC) as the controller activates its outputs. This will continue until contacts (M) open under moisture control unit (MCU) control or the controller (TC) times out. The counter (CR) then resets to zero when the timer (TR) times out and contacts (C) open at that time.

The present invention has the soil moisture sensing device (S) in a turf or ground cover area as an environmental standard to monitor the degree of water depletion in its root zone. As the ratio of water depletion at the sensor location is relatively similar to the ratios of water use of most other plants, it constitutes a useful environmental standard in relating plant water needs to the weather and changing the interval between irrigations accordingly.

When the weather cools down or it rains, the rate of water depletion from the soil decreases and the sensor (S) cause the interval between irrigations to extend.

When the weather warms up and evapotranspiration increases, and with it the rate of depletion increases, so the sensor (S) decreases the interval between irrigations accordingly.

With the present invention each irrigation cycle is counted into a control circuit which after a pre-set number of shallow irrigations, permits watering of the deeper rooted plantings to take place for a duration independently set to permit the wetting front to reach the desired depth.

Various modifications of this invention will be apparent to those skilled in the art. Thus, the scope of the invention is to be limited only by the appended claims.

I claim:

1. An irrigation controller for controlling water supply in a water distribution system including separate valve means for directing or preventing water flow to first and second zones, wherein said first and second zones contain either primarily shallow rooted or primarily deep rooted plants, respectively, said controller comprising:
    (a) a moisture sensing device adapted for location in said first zone for sensing soil moisture content of said first zone;
    (b) first circuit means for energizing and de-energizing said valve means controlling water flow to said first zone;
    (c) second circuit means for energizing and de-energizing said valve means controlling water flow to said second zone;
    (d) first energizing means for energizing said first circuit means when said moisture sensing device determines that the soil moisture content of said first zone is below a predetermined level;
    (e) counter means for counting a predetermined number of times that said first circuit means is energized; and
    (f) second energizing means for energizing said second circuit means after said predetermined number of times that said first circuit means is energized.

2. An irrigation controller for controlling water supply in a water distribution system, said system including respective first and second valve means for directing or preventing water flow to respective first and second zones, said first zone and said second zone containing either primarily shallow rooted or primarily deep rooted plants, said controller comprising:
    (a) a moisture sensing device adapted for location in said first zone for sensing soil moisture content of said first zone;
    (b) first circuit means for energizing and de-energizing said first valve means for controlling water flow to said first zone in response to said moisture sensing device;
    (c) second circuit means for energizing and de-energizing said second valve means for controlling water flow to said second zone; and
    (d) ratio means adapted to interact with said second circuit means to provide less frequent watering to said second zone than to said first zone in accordance with a predetermined ratio.

3. A controller as claimed in claim 2, wherein said ratio means includes:
    counter means for counting a predetermined number of times that said first circuit means is energized.

4. A controller as claimed in claim 2, wherein said predetermined ratio is based on a multiple of intervals resulting from the watering of said first zone.

5. A controller as claimed in claim 2, wherein said ratio means includes:
    timer means for timing a period which exceeds the desired interval in which said first zone would ordinarily be watered, and includes the occurrence of any repeated watering events, said ratio means being adapted to activate said second circuit means in response to the output of said timer means.

* * * * *